(12) United States Patent
Feijoo

(10) Patent No.: US 12,556,390 B2
(45) Date of Patent: Feb. 17, 2026

(54) CENTRALIZATION OF AUTHENTICATION SERVERS FOR DIFFERENT RESOURCE SERVERS

(71) Applicant: Citrix Systems, Inc., Fort Lauderdale, FL (US)

(72) Inventor: Ricardo Fernando Feijoo, Davie, FL (US)

( * ) Notice: Subject to any disclaimer, the term of this patent is extended or adjusted under 35 U.S.C. 154(b) by 741 days.

(21) Appl. No.: 17/836,277

(22) Filed: Jun. 9, 2022

(65) Prior Publication Data

US 2023/0403152 A1    Dec. 14, 2023

(51) Int. Cl.
*H04L 9/32* (2006.01)
*H04L 67/1097* (2022.01)
(52) U.S. Cl.
CPC .......... *H04L 9/3213* (2013.01); *H04L 9/3226* (2013.01); *H04L 67/1097* (2013.01)
(58) Field of Classification Search
None
See application file for complete search history.

(56) References Cited

U.S. PATENT DOCUMENTS

| | | | |
|---|---|---|---|
| 10,230,725 B2* | 3/2019 | Peterson | H04L 63/029 |
| 12,301,720 B2* | 5/2025 | Chen | H04L 9/3247 |
| 2025/0023878 A1* | 1/2025 | Sathaye | G06F 9/547 |
| 2025/0139211 A1* | 5/2025 | Venkatesan | G06F 21/31 |

* cited by examiner

*Primary Examiner* — Jeffrey R Swearingen

(57) ABSTRACT

Methods and systems for centralizing disparate authentication servers using scopes are described herein. A computing device may receive, from a client device, a first access request comprising authentication credentials and first scope data. The computing device may then send, to at least one first authentication server associated with the at least one first resource server, a first token request. The computing device may then receive a first token and provide that token to the client device. The computing device may then receive, from the client device, a second access request comprising second scope data. The computing device may send, to at least one second authentication server associated with the at least one second resource server, a second token request. The computing device may then receive a second token and provide that token to the client device.

17 Claims, 5 Drawing Sheets

| | Input Scopes Requested (501) | | | Output (502) |
|---|---|---|---|---|
| | Photos (503a) | Video (503b) | Music (503c) | |
| 504a | Y | N | N | Valid, request access to Photos Resource Server (via Photos Authentication Server) |
| 504b | N | Y | N | Valid, request access to Video Resource Server (via Video Authentication Server) |
| 504c | N | N | Y | Valid, request access to Music Resource Server (via Music Authentication Server) |
| 504d | Y | Y | N | Invalid, authentication to Photos Authentication Server cannot be extended to Video Authentication Server. Output error and/or force sequential access. |
| 504e | N | Y | Y | Invalid, authentication to Video Authentication Server cannot be extended to Music Authentication Server. Output error and/or force sequential access. |
| 504f | Y | N | Y | Valid, request access to Photos Resource Server (via Photos Authentication Server) in manner that also provides access to Music Resource Server |
| 504g | Y | Y | Y | Invalid, authentication to all three servers simultaneously is not possible. Output error and/or force sequential access |

FIG. 5

CENTRALIZATION OF AUTHENTICATION SERVERS FOR DIFFERENT RESOURCE SERVERS

FIELD

Aspects described herein generally relate to computer networking, computer authentication, federated authentication, and hardware and software related thereto. More specifically, one or more aspects describe herein provide for the centralization of different authentication servers using scopes.

BACKGROUND

A user may, using a web browser executing on a user device, log in to one or more services using a federated login procedure. In this manner, one resource server (e.g., an Application Programming Interface (API) provider, a server storing content like videos or images, or the like) might delegate the task of handling authentication tasks to an authentication server (e.g., a federated login server). Different resource servers might delegate authentication tasks to different authentication servers. For example, a first resource server might delegate authentication tasks to a first authentication server, whereas a second resource server might delegate authentication tasks to a second resource server. In this way, for instance, different resource servers might be protected be different authentication servers with different levels of security and based on different authentication protocols.

One flaw in the above process is that users might be forced to interface with a wide variety of different authentication servers when performing tasks. For example, the same cloud service provider might provide a variety of different resource servers, each with their own corresponding authentication server, and customers of the cloud service provider might thereby be forced to constantly re-authenticate with different authentication servers. In other words, the circumstances described above (where different resource servers correspond to different authentication servers) may effectively prevent a system from providing Single Sign On (SSO) functionality.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards centralizing authentication processes for different resource services.

As will be explained in further detail below, a computing device may receive, from a client device, a first access request comprising authentication credentials and first scope data that indicates at least one first resource server of a plurality of resource servers. That first scope data may indicate one or more first APIs provided by the at least one first resource server. The computing device may then send, based on the first scope data, to at least one first authentication server (e.g., at least one first OAuth authentication server) associated with the at least one first resource server, and based on authenticating the client device based on the authentication credentials in the first access request, a first token request. As part of sending this first token request, the computing device may identify, based on the first scope data, the at least one first authentication server associated with the at least one first resource server. Additionally and/or alternatively, as part of sending the first token request, the computing device may identify, based on the first scope data, the at least one first authentication server associated with the at least one first resource server. The computing device may receive, from the at least one first authentication server, a first token configured to provide the client device access to the at least one first resource server. Then, the computing device may send, to the client device, the first token. The computing device may receive, from the client device, a second access request comprising second scope data that indicates at least one second resource server of the plurality of resource servers. That second scope data may indicate one or more second APIs provided by the at least one second resource server. The computing device may then send, based on the second scope data, to at least one second authentication server (e.g., at least one second OAuth authentication server) associated with the at least one second resource server, and based on authenticating the client device based on the authentication credentials in the first access request, a second token request. The computing device may then receive, from the at least one second authentication server, a second token configured to provide the client device access to the at least one second resource server and send, to the client device, the second token.

As part of the above process, the computing device may be configured to detect circumstances where a user requests access to a scope of resources that cannot be provided. For example, the computing device may receive a third access request comprising the authentication credentials and third scope data that indicates at least two resource servers of the plurality of resource servers. Then, the computing device may send, to the client device and based on comparing the third scope data to a compatibility database, a notification indicating that a single token cannot provide access to both of the at least two resource servers.

Sending token requests may be based on authenticating a client device. For example, the computing device may send, to the client device and based on authenticating the client device based on the authentication credentials in the first access request, a third token. In turn, the second access request may comprise the third token, and the second token request may be sent based on authenticating the third token.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5 shows a table showing illustrative scopes for three different resource servers.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards centralizing different authentication servers. Different resource servers may be associated with different authentication servers. In turn, under ordinary circumstances, even if the resource servers collectively provided a service to a user, the user may be forced to log in to each authentication server in order to access the resource server it is associated with. Aspects described herein address this issue by centralizing authentication with a centralized authentication server, then using scopes defined by a request for access to determine how to route the request to the appropriate authentication server. Through this process, a user might only interact with a single server (e.g., the centralized authentication server), but may be thereby able to authenticate with a wide variety of different authentication servers that correspond to a wide variety of resource servers.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof The use of the terms "connected," "coupled," and similar terms, is meant to include both direct and indirect connecting, coupling, and the like.

Computing Architecture

Figure 1:
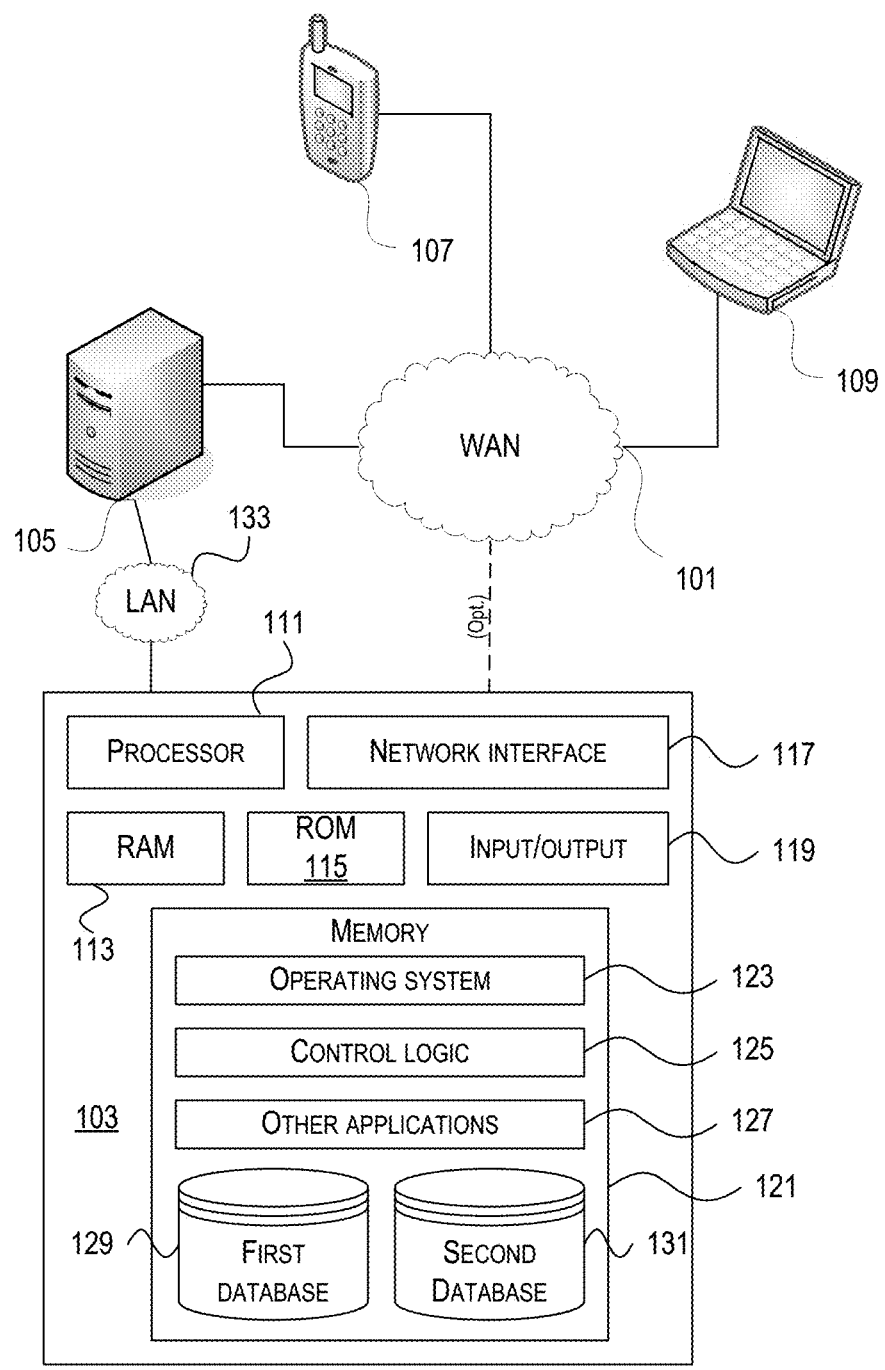
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125.

Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
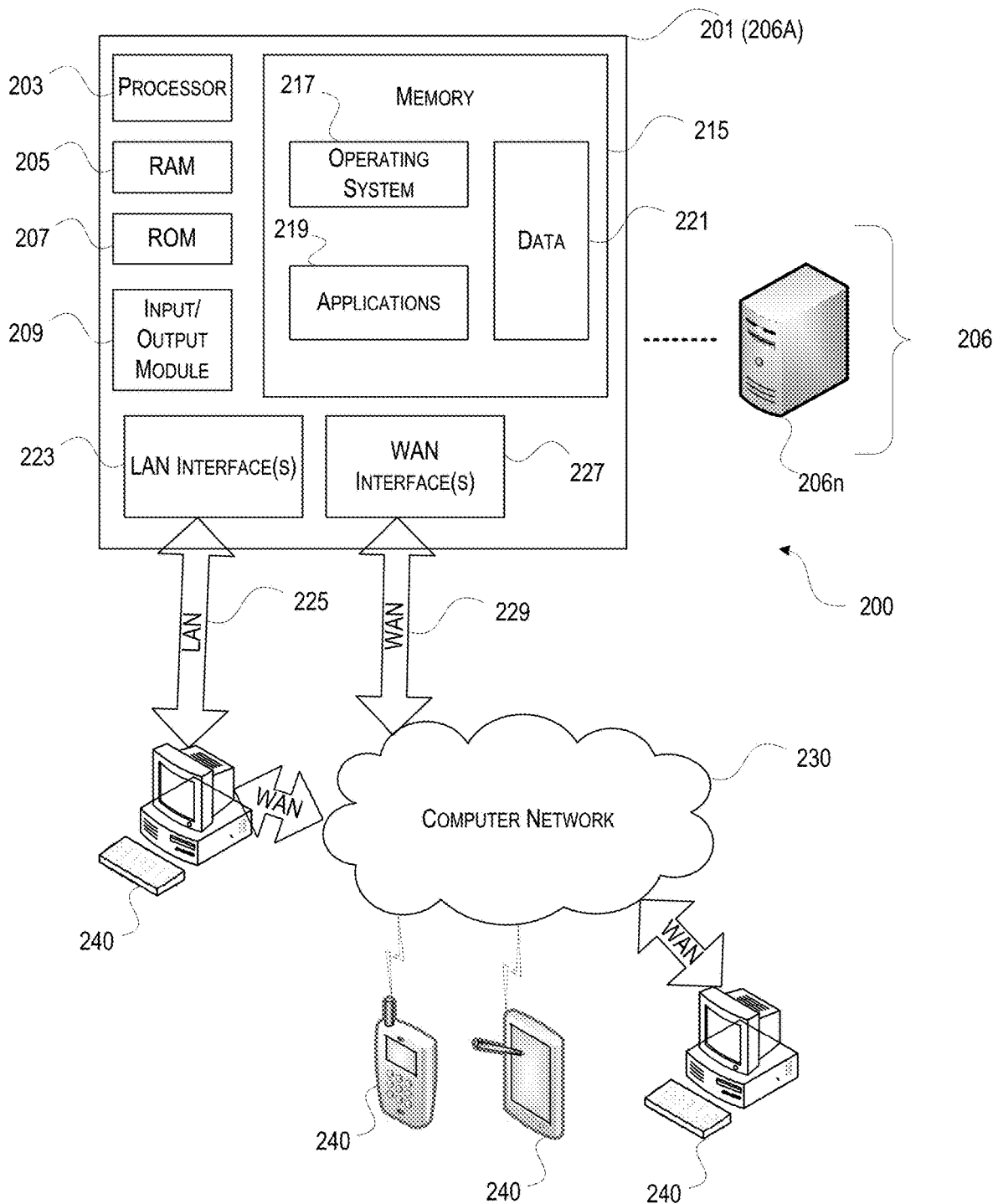
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Centralization of Authentication Servers Using Scopes

Figure 3:
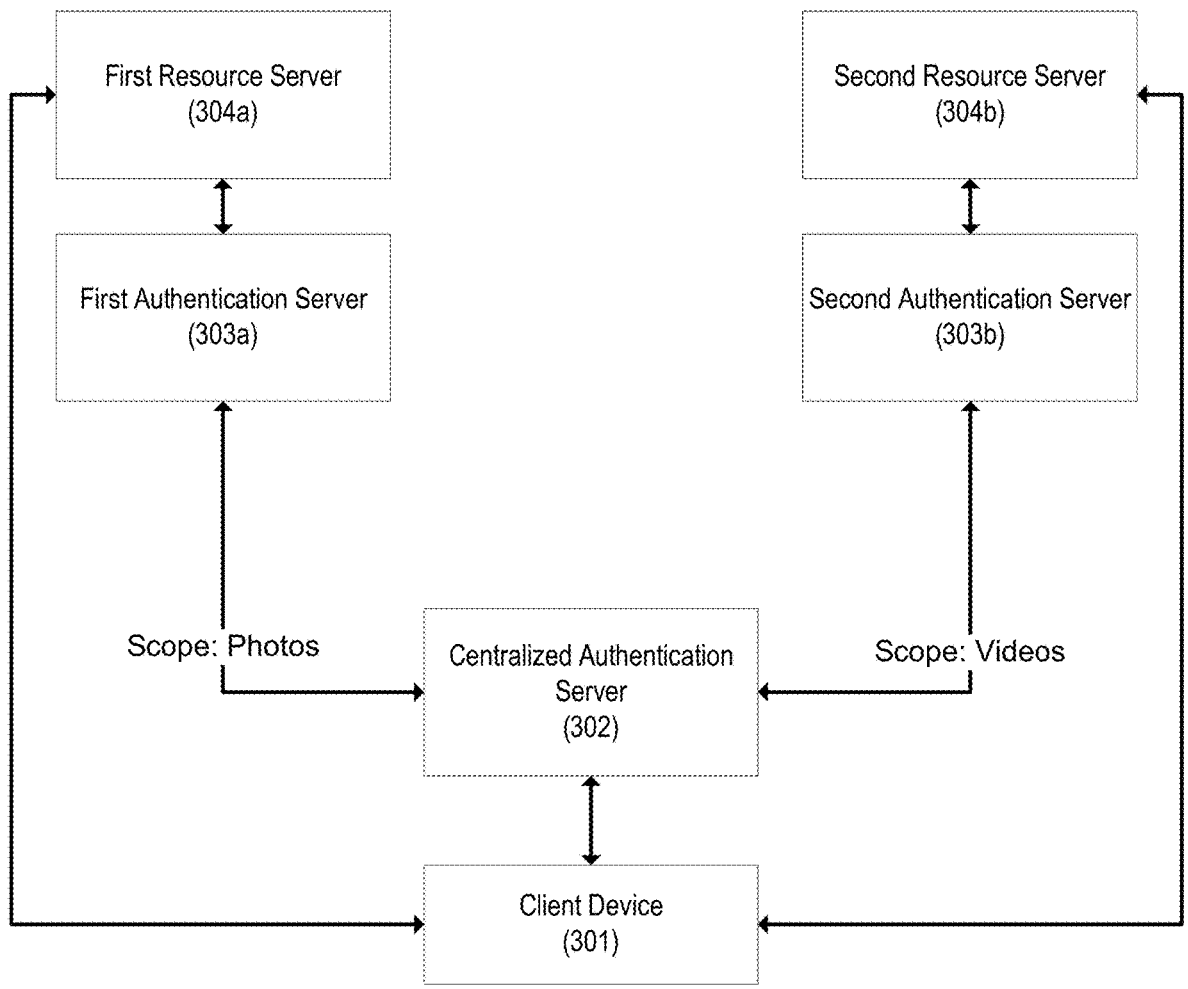
FIG. 3 depicts an illustrative system comprising a client device, a centralized authentication server, and different resource servers with different authentication servers.

FIG. 3 depicts an illustrative system for federated authentication. FIG. 3 includes a client device 301, a centralized authentication server 302, a first authentication server 303a associated with a first resource server 304a, and a second authentication server 303b associated with a second resource server 304b. One or more of the client device 301, the centralized authentication server 302, the first authentication server 303a, the first resource server 304a, the second authentication server 303b, and/or the second resource server 304b may be all or portions of a computing device, such as one or more of the devices 103, 105, 107, and/or 109 of FIG. 1, and/or the client device 240 and/or server 206 of FIG. 2. Additionally and/or alternatively, one or more of the client device 301, the centralized authentication server 302, the first authentication server 303a, the first resource server 304a, the second authentication server 303b, and/or the second resource server 304b may be one or more computing devices that comprise one or more processors and memory storing instructions that, when executed by the one or more processors, cause performance of one or more steps. Additionally and/or alternatively, one or more of the tasks performed by one or more of the client device 301, the centralized authentication server 302, the first authentication server 303a, the first resource server 304a, the second authentication server 303b, and/or the second resource server 304b may be implemented by one or more non-transitory computer-readable media.

The client device 301 may be a computing device such as a laptop, desktop computer, smartphone, virtual reality device, tablet, or the like. As will be detailed further below, the client device 301 may be capable of sending requests for access to resource servers, such as the first resource server 304*a* and/or the second resource server 304*b*. Those requests might be API calls, requests for content (e.g., video content, audio content, textual content), or the like.

The centralized authentication server 302 may be configured to manage authentication of the client device 301 across a variety of different authentication servers, such as the first authentication server 303*a* and the second authentication server 303*b*. In this manner, the centralized authentication server 302 might act like a multiplexer, taking a wide variety of different requests for authentication for resource servers and directing those requests to the appropriate authentication server. To route such requests to the appropriate authentication server, the centralized authentication server 302 may analyze scopes indicated in the requests to identify one or more resource servers associated with the request, then route the requests to the appropriate authorization server(s) associated with those one or more resource servers.

The first authentication server 303*a* and/or the second authentication server 303*b* may comprise computing devices configured to handle authentication for one or more resource servers, such as the first resource server 304*a* and/or the second resource server 304*b*. The authentication servers may perform authentication according to one or more protocols, such as the OAuth Protocol, the AuthO Protocol, the Security Assertion Markup Language (SAML) Protocol, or the like. For example, each of the authentication servers may be configured to receive user authentication credentials (e.g., one or more usernames, one or more passwords, one or more two-factor authentication codes), validate those credentials (e.g., by comparing the user authentication credentials to data stored in a database), and then provide access to one or more resource servers based on the validation of those credentials. Different authentication servers may authenticate based on the same or different protocols. For example, the first authentication server 303*a* may comprise a first OAuth authentication server and the second authentication server 303*b* may comprise a second OAuth authentication server. As another example, the first authentication server 303*a* may comprise an OAuth authentication server and the second authentication server 303*b* may comprise a SAML authentication server.

The first resource server 304*a* and/or the second resource server 304*b* may comprise servers configured to provide resources (e.g., data, API functionality, or the like). The resource servers may provide a wide variety of resources in a wide variety of circumstances. All or portions of those resources may be conditioned on successful authentication of the client device 301 by one or more authentication servers.

As an example of how the devices in FIG. 3 might function, the client device 301 may send, to the centralized authentication server 302, a first access request. That first access request may comprise authentication credentials (e.g., a username and password). That first access request might also indicate first scope data that indicates at least one first resource server of a plurality of resource servers. For example, the scope data might indicate "Photos," and that scope might correspond to the first resource server 304*a* (because, for instance, the first resource server 304*a* stores photos). The centralized authentication server 302 may send, based on that scope data, a first token request to the first authentication server 303*a* (that is, the first authentication server 303*a* that corresponds to the first resource server 304*a*). The centralized authentication server 302 may then receive, from the first authentication server 303*a*, a first token configured to provide the client device 301 access to the first resource server 304*a*. The centralized authentication server may send that first token to the client device 301. Later, the centralized authentication server 302 may receive, from the client device 301, a second access request comprising second scope data that indicates at least one second resource server of a plurality of resource servers. For example, that second scope data may indicate "Videos," and that scope might correspond to the second resource server 304*b* (because, for instance, the second resource server 304*b* stores videos). The centralized authentication server 302 may send, based on that second scope data, a second token request to the second authentication server 303*b* (that is, the second authentication server 303*b* that corresponds to the second resource server 304*b*). The centralized authentication server 302 may then receive, from the second authentication server 303*b*, a second token configured to provide the client device 301 access to the second resource server 304*b*. The centralized authentication server may send that second token to the client device 301.

Figure 4:
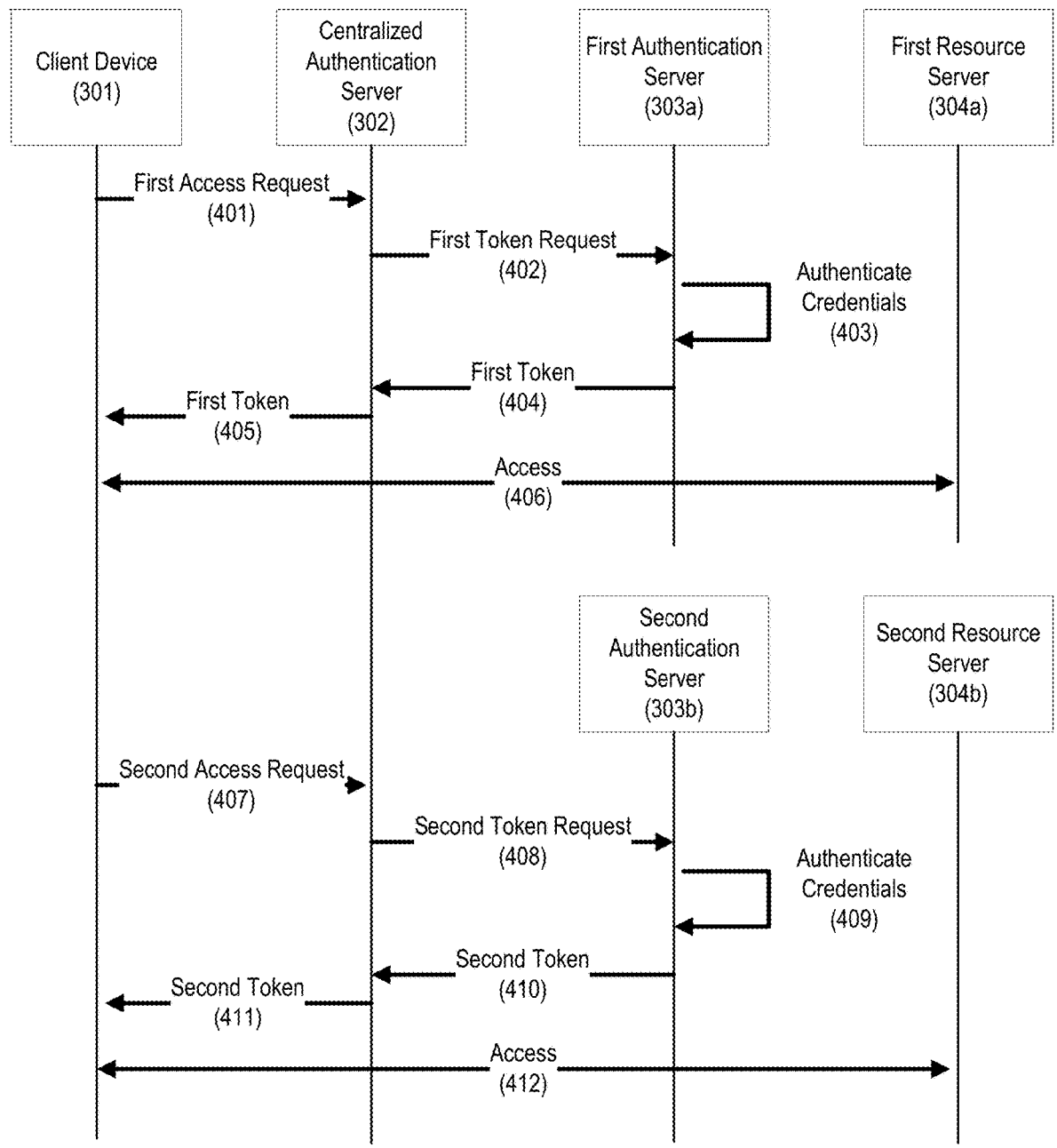
FIG. 4 depicts a messaging diagram with steps involving centralizing authentication for authentication of different resource servers.

FIG. 4 comprises a messaging diagram showing steps that may be performed by the client device 301, the centralized authentication server 302, the first authentication server 303*a*, the first resource server 304*a*, the second authentication server 303*b*, and the second resource server 304. The particular steps shown in FIG. 4 are illustrative, and are intended to illustrate different ways in which the centralized authentication server 302 may handle access requests, such that one or more of the steps may be skipped, replaced, or otherwise modified as desired. A computing device may comprise one or more processors and memory storing instructions that, when executed by the one or more processors, cause performance of one or more of the steps depicted in FIG. 4. Additionally and/or alternatively, one or more non-transitory computer-readable media may store instructions that, when executed by one or more processors of a computing device, cause performance of one or more of the steps depicted in FIG. 4.

Step 401 through step 406 describe an illustrative process whereby the client device 301 gains access to a token which enables the client device 301 to access resources provided by a first resource server 304*a*.

In step 401, the client device 301 may send, to the centralized authentication server 302, a first access request. That first access request might comprise information that enables the client device 301 to access the first resource server 304*a* via the first authentication server 303*a*. For example, the first access request might comprise authentication credentials, such as those that might be associated with the first authentication server 303*a*. The first access request might additionally and/or alternatively comprise first scope data. First scope data may indicate at least one resource server of a plurality of resource servers. For example, in the example depicted in FIG. 4, the scope data may comprise some indication of the first resource server 304*a*.

Scope data, such as the first scope data in the first access request sent in step 401, need not directly indicate a resource server, such as the first resource server 304*a*. For example, the scope data may indicate a service (e.g., "music"), and the centralized authentication server 302 may identify a resource server (e.g., the first resource server 304*a*) based on determining that the scope data corresponds to the resource server (e.g., by determining that the first resource server 304*a* stores music). Additionally and/or alternatively, the scope data may indicate one or more APIs provided by a resource server, such that the resource server(s) (and/or their corresponding authentication server(s)) may be identified based on those APIs. For example, the first scope data may indicate one or more first APIs provided by the at least one first resource server. As such, the scope data may comprise any data that may directly or indirectly be determined to be associated with one or more resource servers.

In step 402, the centralized authentication server 302 may send, to the first authentication server 303a, a first token request. The first token request may comprise all or portions of the data in the first access request received as part of step 401. For example, the first token request may comprise the authentication credentials received by the centralized authentication server 302 in step 401. Additionally and/or alternatively, the first token request may comprise the first scope data received by the centralized authentication server 302 in step 401.

As part of sending the first token request, the centralized authentication server 302 may authenticate the client device 301 based on the authentication credentials received as part of the first access request sent in step 401. The centralized authentication server 302 may then provide, to the client device 301, a cookie configured to authenticate subsequent communications between the client device 301 and the centralized authentication server 302. For example, the centralized authentication server 302 may send, to the client device and based on authenticating the client device based on the authentication credentials in the first access request, a third token. As will be described below, subsequent communications between the client device 301 and the centralized authentication server (e.g., the second access request sent as part of step 407) may include the third token, and subsequent actions by the centralized authentication server 302 (e.g., the sending of the second token request as part of step 408) may be conditioned on authentication of that third token. This process may effectively replace all or portions of the authentication processes performed later in step 403. For example, the centralized authentication server 302 may be configured to confirm the validity of authentication credentials before passing those credentials over to the first authentication server 303a for further validation. While this might be redundant in certain circumstances, it may be implemented so as to add a layer of security to the system.

As part of sending the first token request, the centralized authentication server 302 may be configured to identify, based on the first scope data, an authentication server to send a token request to. For example, the centralized authentication server 302 may process the first scope data to identify one or more authentication servers (e.g., the first authentication server 303a). In this manner, the centralized authentication server 302 may identify, from a plurality of different authentication servers, an authentication server that can provide authentication and thereby provide access to the resource(s) requested by the scope data.

As part of sending the first token request, the centralized authentication server 302 may be configured to retrieve and send, as part of the first token request, second authentication credentials instead of and/or in addition to the authentication credentials received as part of the first access request in step 401. The authentication credentials provided in the first access request may correspond to the centralized authentication server 302. In turn, upon successful authentication of those authentication credentials, the centralized authentication server 302 may retrieve second authentication credentials that correspond to a particular authentication server (e.g., the first authentication server 303a). For example, the computing device may determine, based on the authentication credentials, second authentication credentials associated with the at least one first authentication server. In that circumstance, the first token request may comprise the second authentication credentials. In this manner, the centralized authentication server 302 may act, in part, as a password manager: the user of the client device 301 need only use and remember one set of authentication credentials, whereas the centralized authentication server 302 can maintain, on behalf of the user, a virtually unlimited number of authentication credentials for a wide variety of different authentication servers.

As part of sending the first token request, the centralized authentication server 302 may determine whether scope data, such as the first scope data, is valid. Scope data may request access to a plurality of different resource servers. For example, a user might request, through the client device 301, access to both the first resource server 304a and the second resource server 304b. In some circumstances, this may be a permissible request. For example, the first authentication server 303a and the second authentication server 303b may share sessions, such that a valid login to the first authentication server 303a may provide access to both the first resource server 304a and the second resource server 304b. In such an example, if the scope data asks for access to both the first resource server 304a and the second resource server 304b, this request may be valid, and the process may proceed to step 403. That said, in other circumstances, a user might not be able to access multiple resource servers at once. For example, a login to the first authentication server 303a might not provide access to the second resource server 304b. In such a circumstance, if a user asks for access to both resource servers simultaneously, this request might not be possible.

There may be some circumstances in which scope data, such as the first scope data, is not valid. For example, the first access request sent as part of step 401 may indicate a plurality of resource servers, but that plurality may be inconsistent in that a single authentication process might not be capable of providing access to all of those plurality of remote servers simultaneously. For example, the computing device may receive a third access request comprising the authentication credentials and third scope data that indicates at least two resource servers of the plurality of resource servers. That third scope data might request an incompatible. In response, the computing device may send, to the client device 301 and based on comparing the third scope data to a compatibility database, a notification indicating that a single token cannot provide access to both of the at least two resource servers. Additionally and/or alternatively, as will be detailed further below, the client device 301 may be provided access to a plurality of different resource servers in a sequential manner. After all, FIG. 4 depicts the client device 301 receiving access to both the first resource server 304a and the second resource server 304b, albeit sequentially.

In step 403, the first authentication server 303a may authenticate the authentication credentials received as part of the first access request sent in step 401. For example, the first authentication server 303a may process the authentication credentials to determine whether the authentication credentials are valid. Such processing might include, for instance, comparing the authentication credentials to a database of valid authentication credentials.

In step 404, the centralized authentication server 302 may receive, from the first authentication sever 303a, a first token. The first token may be configured to provide the client device 301 access to the first resource server 304a. For example, the first token may comprise a cookie or similar data element that, when presented to the first resource server 304a, enables a session between the client device 301 and the first resource server 304a through which the client device 301 may access resources stored on the first resource server 304a.

In step 405, the centralized authentication server 302 may send, to the client device 301, the first token. In this manner, the centralized authentication server 302 may pass along the first token to the client device 301. Additionally and/or alternatively, the first authentication server 303a may send the first token directly to the client device 301.

In step 406, the client device 301 may access the first resource server 304a using the first token received as part of step 405. As indicated with respect to step 404, the first token may provide the client device 301 access to one or more resources provided by the first resource server 304a. For example, the first token may be usable to make API calls to the first resource server 304a and/or to retrieve data stored by the first resource server 304a.

Step 407 through step 412 describe an illustrative process whereby the client device 301 gains access to a token which enables the client device 301 to access resources provided by a second resource server 304b. Critically, unlike step 401 through 407, these processes involve the second authentication server 303b and the second resource server 304b. More broadly, as illustrated by step 407 through step 412 in comparison with step 401 through step 406, with the aid of the centralized authentication server 302, the client device 301 need only interface with the centralized authentication server 302 during authentication to gain access to the appropriate resource server.

In step 407, the client device 301 may send, to the centralized authentication server 302, a second access request. This step may be the same or similar as step 401, but the second access request may comprise different scope data as compared to the first access request sent in step 401. For example, the second access request may comprise second scope data that directly and/or indirectly corresponds to the second resource server 304b, rather than the first resource server 304a. As one example, the second scope data may indicate one or more second APIs provided by the at least one second resource server, whereas the first scope data may indicate one or more first APIs provided by the at least one first resource server.

In step 408, the centralized authentication server 302 may send, to the second authentication server 303b, a second token request. This step may be the same or similar as step 402, except that the second token request may comprise all or portions of data from the second access request received as part of step 407.

In step 409, the second authentication server 303b may authenticate the credentials. This process may be the same or similar as step 403. In some circumstances, the authentication performed in step 409 may involve a cookie, rather than other forms of authentication credentials. As part of step 403, the first authentication server 303a may provide, to the client device 301, a cookie. If so configured, the second authentication server 303b may be configured to authenticate the client device 301 based on that cookie. In other words, the authentication credentials in the second access request sent in step 407 and/or the second token request sent in step 408 may comprise a cookie, and the authentication process in step 409 may be based on that cookie.

In step 410, the centralized authentication server 302 may receive, from the second authentication sever 303a, a second token. The second token may be configured to provide the client device 301 access to the second resource server 304b. For example, the second token may comprise a cookie or similar data element that, when presented to the second resource server 304b, enables a session between the client device 301 and the second resource server 304b through which the client device 301 may access resources stored on the second resource server 304b.

In step 411, the centralized authentication server 302 may send, to the client device 301, the second token. In this manner, the centralized authentication server 302 may pass along the second token to the client device 301. Additionally and/or alternatively, the second authentication server 303b may send the second token directly to the client device 301.

In step 412, the client device 301 may access the second resource server 304b using the second token. As indicated with respect to step 410, the second token may provide the client device 301 access to one or more resources provided by the second resource server 304b. For example, the second token may be usable to make API calls to the second resource server 304b and/or to retrieve data stored by the second resource server 304b.

The process depicted in FIG. 4 illustrates how a user might be provided access to multiple resource servers via the centralized authentication server 302. Assume, for example, that each authentication server depicted in FIG. 4 provides access to only a single resource server. Assume further that a user wants to access both resource servers. The user might not be able to request both resource servers simultaneously: for example, the first authentication server 303a might authenticate users in an entirely different way than the second authentication server 303b. In that circumstance, the user might be able to access both servers, albeit in a sequential manner. For example, the process depicted in step 401 through step 406 might be performed to provide the client device 301 access to the first resource server 304a. Then, when the client device 301 subsequently requests access to the second resource server 304b (e.g., by browsing to a webpage associated with the second resource server 304b), the client device 301 may be redirected to a second webpage associated with the centralized authentication server 302, and the process depicted from step 407 to step 412 may be performed. In that manner, the user might be quickly provided access to the second resource server 304b. Indeed, this process might not even require affirmative user involvement: the centralized authentication server 302 might perform step 409 based on a cookie (rather than requiring that the user manually enter in authentication credentials), such that the process depicted from step 407 to step 412 might not require user input.

Discussion will now turn to an example of how scopes may be evaluated for validity. As part of an access request, a client device (e.g., the client device 301) may provide scope data that indicates one or more resources. In some circumstances, the combination of resources requested might be provided to the client device even if those resources are provided by different resource servers. For instance, multiple resource servers might be configured to accept similar authentication tokens, such that authentication with an authentication server for one resource server might in fact provide access to a wide variety of other resource servers. That said, in other circumstances, the combination of resources requested by that client device might not be something that can be provided by the centralized authentication server 302. For instance, authentication with the first authentication server 303a might provide access to the first resource server 304a, but not the second resource server 304b. In such a circumstance, the centralized authentication server 302 might output an error and/or might provide sequential access to such servers (e.g., the centralized authentication server 302 may provide access to the first resource server 304a first, then detect that the user wants to access a resource stored by the second resource server 304b, then may perform the steps depicted in step 407 through step 412 of FIG. 4 to provide access to the second resource server 304b).

FIG. 5 shows a table showing illustrative scopes for three different resource servers. Such a table may be all or portions of a database used to determine whether scope data is valid. In other words, such a table may be used to determine whether the centralized authentication server 302 can authenticate the client device 301 in a manner that provides access to all of the resource server(s) requested by the client device 301.

In the table shown in FIG. 5, there are two main columns: an input scopes requested column 501 and an output column 502. The input scopes requested column 501 comprises three sub-columns that indicate, for each row, whether a user requested photos, video, and/or music. Specifically, the sub-columns include a photos sub-column 503a, a video sub-column 503b, and a music column 503c, with a value of "Y" in a sub-column indicating that the corresponding scope was requested, and a value of "N" in a sub-column indicating that the corresponding scope was not requested.

Row 504a indicates an access request comprising a request for photos. In such a circumstance, the request may be determined to be valid, and the centralized authentication server 302 may request access to a photos resource server by authenticating with a photos authentication server.

Row 504b indicates an access request comprising a request for video. In such a circumstance, the request may be determined to be valid, and the centralized authentication server 302 may request access to a video resource server by authenticating with a video authentication server.

Row 504c indicates an access request comprising a request for music. In such a circumstance, the request may be determined to be valid, and the centralized authentication server 302 may request access to a music resource server by authenticating with a music authentication server.

Row 504d indicates an access request comprising a request for both photos and video. In this circumstance, this request may be invalid: authentication via the photos authentication server might not be capable of providing access to the video resource server, and authentication via the video authentication server might not be capable of providing access to the photos resource server. In this circumstance, the centralized authentication server 302 may output an error. Additionally and/or alternatively, the centralized authentication server 302 may provide the client device 301 access to both resource servers sequentially. For instance, the centralized authentication server 302 may authenticate with the photos authentication server first, then later—when a user of the client device 301 later requests a video—may authenticate with the video authentication server.

Row 504e indicates an access request comprising a request for both video and music. In this circumstance, this request may be invalid: authentication via the video authentication server might not be capable of providing access to the music resource server, and authentication via the music authentication server might not be capable of providing access to the video resource server. In this circumstance, the centralized authentication server 302 may output an error and/or provide sequential access.

Row 504f indicates an access request comprising a request for both photos and music. In this circumstance, this request may be valid, as one or both of the photos authentication server and the video authentication server may be configured to perform authentication in a manner which provides access to both the photos resource server and the videos resource server. For example, both the photos authentication server and the video authentication server may use the same authentication protocol, may share the same sessions database, or the like. In this circumstance, the centralized authentication server 302 may authenticate with one or both of the photos authentication server or the video authentication server, such that the client device 301 is provided access to both the photos resource sever and the videos resource server.

Row 504g indicates an access request comprising a request for all three of photos, video, and music. Like the situations depicted in row 504d and row 504e, such a request is invalid, as authentication to all three servers simultaneously might not be possible. In such a circumstance, the centralized authentication server 302 might output an error and/or provide sequential access to such servers.

The following paragraphs (M1) through (M7) describe examples of methods that may be implemented in accordance with the present disclosure.

(M1) A method comprising receiving, from a client device, a first access request comprising: authentication credentials; and first scope data that indicates at least one first resource server of a plurality of resource servers; sending, based on the first scope data, to at least one first authentication server associated with the at least one first resource server, and based on authenticating the client device based on the authentication credentials in the first access request, a first token request; receiving, from the at least one first authentication server, a first token configured to provide the client device access to the at least one first resource server; and sending, to the client device, the first token; receiving, from the client device, a second access request comprising second scope data that indicates at least one second resource server of the plurality of resource servers; sending, based on the second scope data, to at least one second authentication server associated with the at least one second resource server, and based on authenticating the client device based on the authentication credentials in the first access request, a second token request; receiving, from the at least one second authentication server, a second token configured to provide the client device access to the at least one second resource server; and sending, to the client device, the second token.

(M2) A method may be performed as described in paragraph (M1) further comprising: receiving a third access request comprising the authentication credentials and third scope data that indicates at least two resource servers of the plurality of resource servers; and sending, to the client device and based on comparing the third scope data to a compatibility database, a notification indicating that a single token cannot provide access to both of the at least two resource servers.

(M3) A method may be performed as described in paragraph (M1) or (M2), wherein sending the first token request comprises: identifying, based on the first scope data, the at least one first authentication server associated with the at least one first resource server.

(M4) A method may be performed as described in any one of paragraphs (M1)-(M3), wherein sending the first token request comprises: determining, based on the authentication credentials, second authentication credentials associated with the at least one first authentication server, wherein the first token request comprises the second authentication credentials.

(M5) A method may be performed as described in any one of paragraphs (M1)-(M4), further comprising: sending, to the client device and based on authenticating the client device based on the authentication credentials in the first access request, a third token, wherein the second access request comprises the third token, and wherein sending the second token request based on authenticating the third token.

(M6) A method may be performed as described in any one of paragraphs (M1)-(M5), wherein the at least one first authentication server comprises a first OAuth authentication server associated with a first organization, and wherein the at least one second authentication server comprises a second OAuth authentication server associated with a second organization.

(M7) A method may be performed as described in any one of paragraphs (M1)-(M6), wherein the first scope data indicates one or more first APIs provided by the at least one first resource server, and wherein the second scope data indicates one or more second APIs provided by the at least one second resource server.

The following paragraphs (A1) through (A7) describe examples of apparatuses that may be implemented in accordance with the present disclosure.

(A1) A computing device comprising: one or more processors; and memory storing instructions that, when executed by the one or more processors, cause the computing device to: receive, from a client device, a first access request comprising: authentication credentials; and first scope data that indicates at least one first resource server of a plurality of resource servers; send, based on the first scope data, to at least one first authentication server associated with the at least one first resource server, and based on authenticating the client device based on the authentication credentials in the first access request, a first token request; receive, from the at least one first authentication server, a first token configured to provide the client device access to the at least one first resource server; and send, to the client device, the first token; receive, from the client device, a second access request comprising second scope data that indicates at least one second resource server of the plurality of resource servers; send, based on the second scope data, to at least one second authentication server associated with the at least one second resource server, and based on authenticating the client device based on the authentication credentials in the first access request, a second token request; receive, from the at least one second authentication server, a second token configured to provide the client device access to the at least one second resource server; and send, to the client device, the second token.

(A2) The computing device as described in paragraph (A1), wherein the instructions, when executed by the one or more processors, further cause the computing device to: receive a third access request comprising the authentication credentials and third scope data that indicates at least two resource servers of the plurality of resource servers; and send, to the client device and based on comparing the third scope data to a compatibility database, a notification indicating that a single token cannot provide access to both of the at least two resource servers.

(A3) The computing device as described in any one of paragraphs (A1)-(A2), wherein the instructions, when executed by the one or more processors, cause the computing device to send the first token request by causing the computing device to: identify, based on the first scope data, the at least one first authentication server associated with the at least one first resource server.

(A4) The computing device as described in any one of paragraphs (A1)-(A3), wherein the instructions, when executed by the one or more processors, cause the computing device to send the first token request by causing the computing device to: determine, based on the authentication credentials, second authentication credentials associated with the at least one first authentication server, wherein the first token request comprises the second authentication credentials.

(A5) The computing device as described in any one of paragraphs (A1)-(A4), wherein the instructions, when executed by the one or more processors, further cause the computing device to: send, to the client device and based on authenticating the client device based on the authentication credentials in the first access request, a third token, wherein the second access request comprises the third token, and wherein the instructions, when executed by the one or more processors, cause the computing device to send the second token request based on authenticating the third token.

(A6) The computing device as described in any one of paragraphs (A1)-(A5), wherein the at least one first authentication server comprises a first OAuth authentication server associated with a first organization, and wherein the at least one second authentication server comprises a second OAuth authentication server associated with a second organization.

(A7) The computing device as described in any one of paragraphs (A1)-(A6), wherein the first scope data indicates one or more first APIs provided by the at least one first resource server, and wherein the second scope data indicates one or more second APIs provided by the at least one second resource server.

The following paragraphs (CRM1) through (CRM7) describe examples of computer-readable media that may be implemented in accordance with the present disclosure.

(CRM1) One or more non-transitory computer-readable media storing instructions that, when executed by one or more processors of a computing device, cause the computing device to: receive, from a client device, a first access request comprising: authentication credentials; and first scope data that indicates at least one first resource server of a plurality of resource servers; send, based on the first scope data, to at least one first authentication server associated with the at least one first resource server, and based on authenticating the client device based on the authentication credentials in the first access request, a first token request; receive, from the at least one first authentication server, a first token configured to provide the client device access to the at least one first resource server; and send, to the client device, the first token; receive, from the client device, a second access request comprising second scope data that indicates at least one second resource server of the plurality of resource servers; send, based on the second scope data, to at least one second authentication server associated with the at least one second resource server, and based on authenticating the client device based on the authentication credentials in the first access request, a second token request; receive, from the at least one second authentication server, a second token configured to provide the client device access to the at least one second resource server; and send, to the client device, the second token.

(CRM2) The one or more non-transitory computer-readable media described in paragraph (CRM1), wherein the instructions, when executed by the one or more processors, further cause the computing device to: receive a third access request comprising the authentication credentials and third scope data that indicates at least two resource servers of the plurality of resource servers; and send, to the client device and based on comparing the third scope data to a compatibility database, a notification indicating that a single token cannot provide access to both of the at least two resource servers.

(CRM3) The one or more non-transitory computer-readable media described in any one of paragraphs (CRM1)-(CRM2), wherein the instructions, when executed by the one or more processors, cause the computing device to send the first token request by causing the computing device to: identify, based on the first scope data, the at least one first authentication server associated with the at least one first resource server.

(CRM4) The one or more non-transitory computer-readable media described in any one of paragraphs (CRM1)-(CRM3), wherein the instructions, when executed by the one or more processors, cause the computing device to send the first token request by causing the computing device to: determine, based on the authentication credentials, second authentication credentials associated with the at least one first authentication server, wherein the first token request comprises the second authentication credentials.

(CRM5) The one or more non-transitory computer-readable media described in any one of paragraphs (CRM1)-(CRM4), wherein the instructions, when executed by the one or more processors, further cause the computing device to: send, to the client device and based on authenticating the client device based on the authentication credentials in the first access request, a third token, wherein the second access request comprises the third token, and wherein the instructions, when executed by the one or more processors, cause the computing device to send the second token request based on authenticating the third token.

(CRM6) The one or more non-transitory computer-readable media described in any one of paragraphs (CRM1)-(CRM5), wherein the at least one first authentication server comprises a first OAuth authentication server associated with a first organization, and wherein the at least one second authentication server comprises a second OAuth authentication server associated with a second organization.

(CRM7) The one or more non-transitory computer-readable media described in any one of paragraphs (CRM1)-(CRM6), wherein the first scope data indicates one or more first APIs provided by the at least one first resource server, and wherein the second scope data indicates one or more second APIs provided by the at least one second resource server.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising:
one or more processors; and
memory storing instructions that, when executed by the one or more processors, cause the computing device to:
receive, from a client device, a first access request comprising:
authentication credentials; and
first scope data that indicates at least one first resource server of a plurality of resource servers;
send, based on the first scope data, to at least one first authentication server associated with the at least one first resource server, and based on authenticating the client device based on the authentication credentials in the first access request, a first token request;
receive, from the at least one first authentication server, a first token configured to provide the client device access to the at least one first resource server; and
send, to the client device, the first token;
receive, from the client device, a second access request comprising second scope data that indicates at least one second resource server of the plurality of resource servers;
send, based on the second scope data, to at least one second authentication server associated with the at least one second resource server, and based on authenticating the client device based on the authentication credentials in the first access request, a second token request;
receive, from the at least one second authentication server, a second token configured to provide the client device access to the at least one second resource server;
send, to the client device, the second token;
receive a third access request comprising the authentication credentials and third scope data that indicates at least two resource servers of the plurality of resource servers: and
send, to the client device and based on comparing the third scope data to a compatibility database, a notification indicating that a single token cannot provide access to both of the at least two resource servers.

2. The computing device of claim 1, wherein the instructions, when executed by the one or more processors, cause the computing device to send the first token request by causing the computing device to:
identify, based on the first scope data, the at least one first authentication server associated with the at least one first resource server.

3. The computing device of claim 1, wherein the instructions, when executed by the one or more processors, cause the computing device to send the first token request by causing the computing device to:
determine, based on the authentication credentials, second authentication credentials associated with the at least one first authentication server, wherein the first token request comprises the second authentication credentials.

4. The computing device of claim 1, wherein the instructions, when executed by the one or more processors, further cause the computing device to:

send, to the client device and based on authenticating the client device based on the authentication credentials in the first access request, a third token, wherein the second access request comprises the third token, and wherein the instructions, when executed by the one or more processors, cause the computing device to send the second token request based on authenticating the third token.

5. The computing device of claim 1, wherein the at least one first authentication server comprises a first OAuth authentication server associated with a first organization, and wherein the at least one second authentication server comprises a second OAuth authentication server associated with a second organization.

6. The computing device of claim 1, wherein the first scope data indicates one or more first APIs provided by the at least one first resource server, and wherein the second scope data indicates one or more second APIs provided by the at least one second resource server.

7. A method comprising:
receiving, from a client device, a first access request comprising:
authentication credentials; and
first scope data that indicates at least one first resource server of a plurality of resource servers;
sending, based on the first scope data, to at least one first authentication server associated with the at least one first resource server, and based on authenticating the client device based on the authentication credentials in the first access request, a first token request;
receiving, from the at least one first authentication server, a first token configured to provide the client device access to the at least one first resource server; and
sending, to the client device, the first token;
receiving, from the client device, a second access request comprising second scope data that indicates at least one second resource server of the plurality of resource servers;
sending, based on the second scope data, to at least one second authentication server associated with the at least one second resource server, and based on authenticating the client device based on the authentication credentials in the first access request, a second token request;
receiving, from the at least one second authentication server, a second token configured to provide the client device access to the at least one second resource server;
sending, to the client device, the second token;
receiving a third access request comprising the authentication credentials and third scope data that indicates at least two resource servers of the plurality of resource servers: and
sending, to the client device and based on comparing the third scope data to a compatibility database, a notification indicating that a single token cannot provide access to both of the at least two resource servers.

8. The method of claim 7, wherein sending the first token request comprises:
identifying, based on the first scope data, the at least one first authentication server associated with the at least one first resource server.

9. The method of claim 7, wherein sending the first token request comprises:
determining, based on the authentication credentials, second authentication credentials associated with the at least one first authentication server, wherein the first token request comprises the second authentication credentials.

10. The method of claim 7, further comprising:
sending, to the client device and based on authenticating the client device based on the authentication credentials in the first access request, a third token, wherein the second access request comprises the third token, and wherein sending the second token request based on authenticating the third token.

11. The method of claim 7, wherein the at least one first authentication server comprises a first OAuth authentication server associated with a first organization, and wherein the at least one second authentication server comprises a second OAuth authentication server associated with a second organization.

12. The method of claim 7, wherein the first scope data indicates one or more first APIs provided by the at least one first resource server, and wherein the second scope data indicates one or more second APIs provided by the at least one second resource server.

13. One or more non-transitory computer-readable media storing instructions that, when executed by one or more processors of a computing device, cause the computing device to:
receive, from a client device, a first access request comprising:
authentication credentials; and
first scope data that indicates at least one first resource server of a plurality of resource servers;
send, based on the first scope data, to at least one first authentication server associated with the at least one first resource server, and based on authenticating the client device based on the authentication credentials in the first access request, a first token request;
receive, from the at least one first authentication server, a first token configured to provide the client device access to the at least one first resource server; and
send, to the client device, the first token;
receive, from the client device, a second access request comprising second scope data that indicates at least one second resource server of the plurality of resource servers;
send, based on the second scope data, to at least one second authentication server associated with the at least one second resource server, and based on authenticating the client device based on the authentication credentials in the first access request, a second token request;
receive, from the at least one second authentication server, a second token configured to provide the client device access to the at least one second resource server;
send, to the client device, the second token:
receive a third access request comprising the authentication credentials and third scope data that indicates at least two resource servers of the plurality of resource servers: and
send, to the client device and based on comparing the third scope data to a compatibility database, a notification indicating that a single token cannot provide access to both of the at least two resource servers.

14. The one or more non-transitory computer-readable media of claim 13, wherein the instructions, when executed by the one or more processors, cause the computing device to send the first token request by causing the computing device to:

identify, based on the first scope data, the at least one first authentication server associated with the at least one first resource server.

15. The one or more non-transitory computer-readable media of claim 13, wherein the instructions, when executed by the one or more processors, cause the computing device to send the first token request by causing the computing device to:

determine, based on the authentication credentials, second authentication credentials associated with the at least one first authentication server, wherein the first token request comprises the second authentication credentials.

16. The one or more non-transitory computer-readable media of claim 13, wherein the instructions, when executed by the one or more processors, further cause the computing device to:

send, to the client device and based on authenticating the client device based on the authentication credentials in the first access request, a third token, wherein the second access request comprises the third token, and wherein the instructions, when executed by the one or more processors, cause the computing device to send the second token request based on authenticating the third token.

17. The one or more non-transitory computer-readable media of claim 13, wherein the at least one first authentication server comprises a first OAuth authentication server associated with a first organization, and wherein the at least one second authentication server comprises a second OAuth authentication server associated with a second organization.

\* \* \* \* \*